Nov. 18, 1941.   S. LEWIS   2,263,177
DUSTPAN
Filed March 26, 1940

INVENTOR.
BY Samuel Lewis
Clark & Ott
ATTORNEYS

Patented Nov. 18, 1941

2,263,177

UNITED STATES PATENT OFFICE 2,263,177

DUSTPAN

Samuel Lewis, New York, N. Y.

Application March 26, 1940, Serial No. 325,949

2 Claims. (Cl. 65—20)

This invention has relation to dust pans of the pivoted receptacle type and is directed to certain improvements in the structural features of a dust pan of the type disclosed in my prior United States Letters Patent, No. 1,484,725, granted February 26, 1924.

The present invention comprehends an improved form of bail and means of connection between the same and the handle so as to insure and maintain a predetermined fixed relation of the bail with reference to the handle.

More particularly the invention contemplates in a dust pan of the indicated character, a common means which serves a plurality of purposes such as a locking of the bail in assembled relation with the handle against turning or sliding movement, the anchoring to the handle plug of the flexible element which controls the opening and closing of the receptacle cover as well as the retention of the plug in the handle.

With these and other objects in view, the invention is set forth in greater detail in the following specification and illustrated in the accompanying drawing in which.

Figure 1:
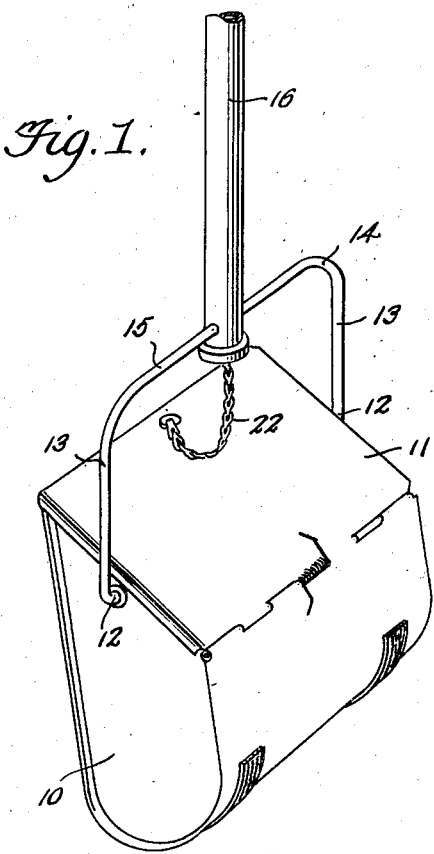
Fig. 1 is a perspective view of a dust pan of the type specified with the receptacle cover in closed position.
Figure 3:
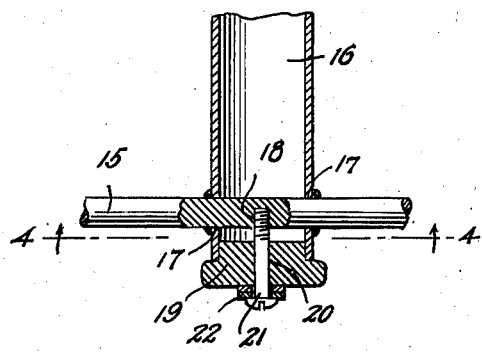
Fig. 3 is an enlarged fragmentary sectional view taken approximately on the line 3—3 of Fig. 2.
Figure 4:
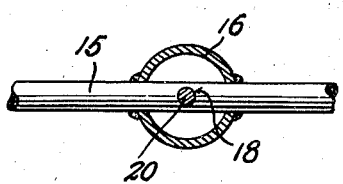
Fig. 4 is an enlarged transverse sectional view taken approximately on the line 4—4 of Fig. 3.

Referring to the drawing by characters of reference, 10 designates the receptacle of a dust pan which is provided with a cover 11 which is hinged thereto. The receptacle 10 is fulcrumed for pivotal movement on inwardly directed trunnions 12 formed at the free terminals of the side arms 13 of a bail 14 which is fashioned from a single length of material and also includes a continuous bight portion 15 joining the side arms 13.

A handle 16 of tubular material carries at its lower end the bail 14 and said handle is formed adjacent its lower end with aligned transverse apertures 17 of a size and shape corresponding approximately to that of the cross sectional size and shape of the bail 14. The bight 15 of the bail is formed intermediate its ends with a radially disposed threaded socket 18, the axis of which is parallel to the axes of the bail arms 13 and coincides with the plane in which said bail arms lie.

Figure 2:
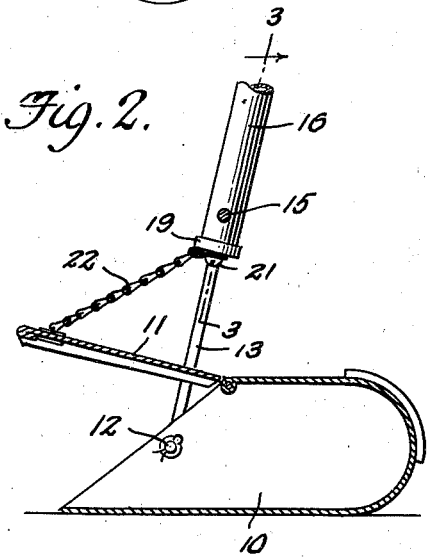
Fig. 2 is a sectional view therethrough illustrating the dust receptacle in active position with the cover opened.

A headed plug 19 is snugly fitted within the lower end of the handle 16 and said plug is provided with a central bore 20 with which the threaded socket of the bight portion of the bail is aligned to receive the threaded shank of a screw 21 which extends through the plug bore 20 and threadedly engages the socket. In this type of dust pan, a chain section or equivalent flexible element 22 is anchored at one end to the hinged cover 11 and the opposite end thereof is connected to the lower end of the handle for the purpose of automatically causing the cover 11 to assume an opened relation to the receptacle 10 when the receptacle is swung from the inactive position shown in Fig. 1 to the active position resting on the floor, as illustrated in Fig. 2. The connection between the chain or flexible element 22 and the handle is established by passing the screw 21 through the uppermost end link of the chain thereby anchoring the same.

From the foregoing it will thus be seen that the screw 21 serves as a common means which respectively secures the bail in a fixed relation to the handle against sliding or turning movement, while anchoring the end of the flexible element to the plug and also retaining the plug within the lower end of the handle. By aligning the socket 18 with the bore 20 of the plug and by disposing the axis of the socket parallel with the axes of the bail arms 13, and by locking the bail through the medium of the screw 21, it is evident that the bail arms will be retained in a fixed relation against swinging movement.

What is claimed is:

1. In a dust pan a receptacle having a hinged cover, a tubular handle having aligned transverse apertures adjacent the lower end thereof, a bail having a bight portion and side arms pivoted to the receptacle adjacent the cover thereof, said bail being fashioned from a single length of material of a cross sectional size to extend snugly through said transversely aligned apertures and having a threaded socket intermediate the ends of the bight portion thereof, a headed plug frictionally fitted within the lower end of the handle having a central bore, a flexible element anchored at one end to the receptacle cover, a screw extending through the plug bore and engaging the threaded socket of the bight portion of the bail, said screw constituting a common means for respectively securing the bail against sliding and turning movement, for anchoring the end of the flexible element to the plug and for retaining the plug within the handle.

2. In a dust pan a receptacle having a hinged cover, a tubular handle having aligned transverse apertures adjacent the lower end thereof, a bail having a bight portion and side arms pivoted to the receptacle adjacent the cover thereof, said bail being fashioned from a single length of material of a cross sectional size to extend snugly through said transversely aligned apertures and having a radially disposed threaded socket intermediate the ends of the bight portion thereof, said socket having its axis parallel to and in a plane coinciding with the axis of the bail arms and the plane in which said arms lie, a member engaging the lower end of the handle having a central bore, a flexible element anchored at one end to the receptacle cover, a screw extending through the bore of said member and engaging the threaded socket of the bight portion of the bail, said screw constituting a common means for respectively securing the bail against sliding and turning movement, for anchoring the end of the flexible element to the member and for securing the same to the handle.

SAMUEL LEWIS.